(12) United States Patent
Ruytjens et al.

(10) Patent No.: US 11,022,807 B2
(45) Date of Patent: Jun. 1, 2021

(54) ELECTRONIC EYE WEAR VIEWING DEVICE

(71) Applicant: Iristick NV, Sint-Martens-Latem (BE)

(72) Inventors: Tim Ruytjens, Mortsel (BE); Philip Madden, Brasschaat (BE); Riemer Grootjans, Antwerp (BE); Jasper Van Bourgognie, Antwerp (BE); Vianney Le Clément de Saint-Marcq, Brussels (BE); Peter Verstraeten, Sint-Martens-Latem (BE)

(73) Assignee: Iristick NV, Sint-Martens-Latem (BE)

( * ) Notice: Subject to any disclaimer, the term of this patent is extended or adjusted under 35 U.S.C. 154(b) by 0 days.

(21) Appl. No.: 16/485,476

(22) PCT Filed: Feb. 13, 2018

(86) PCT No.: PCT/EP2018/053591
§ 371 (c)(1),
(2) Date: Aug. 13, 2019

(87) PCT Pub. No.: WO2018/146339
PCT Pub. Date: Aug. 16, 2018

(65) Prior Publication Data
US 2020/0018974 A1 Jan. 16, 2020

(30) Foreign Application Priority Data

Feb. 13, 2017 (EP) .................................. 17155826

(51) Int. Cl.
*G02B 27/01* (2006.01)

(52) U.S. Cl.
CPC .. *G02B 27/0176* (2013.01); *G02B 2027/0159* (2013.01); *G02B 2027/0178* (2013.01)

(58) Field of Classification Search
None
See application file for complete search history.

(56) References Cited

U.S. PATENT DOCUMENTS

| 5,764,335 A * | 6/1998 | Berke | A42B 1/247 |
| | | | 351/41 |
| 2008/0201901 A1 * | 8/2008 | Cescon | G02C 5/2263 |
| | | | 16/228 |

(Continued)

FOREIGN PATENT DOCUMENTS

| EP | 0899599 A2 | 3/1999 |
| EP | 1202566 A1 | 5/2002 |

*Primary Examiner* — David D Davis
(74) *Attorney, Agent, or Firm* — James Creighton Wray

(57) ABSTRACT

The present invention relates to an electronic eyewear viewing device comprising—a frame (20) arranged to be wearable on a user's head, —a display module comprising a display for viewing images, —a carrier (15) for carrying the display module, said carrier being connected to the frame. The electronic eyewear viewing device further comprises—a primary pivoting hinge system arranged for interconnecting the carrier (15) and the display module and comprising a first at least partially spherical joint (2) rotatably mounted around a first axis (6) passing through the first at least partially spherical joint via a first cut-out (10) and rotatably mounted around a second axis (1) connected with the first at least partially spherical joint (2) via a second cut-out (11) and passing through a hole (60) in said first axis, whereby the second axis crosses the first axis through said hole in a centre point (70) of the first at least partially spherical joint.

11 Claims, 8 Drawing Sheets

(56) References Cited

U.S. PATENT DOCUMENTS

| | | | |
|---|---|---|---|
| 2009/0059381 A1* | 3/2009 | Jannard | G02B 27/017 359/630 |
| 2014/0168599 A1* | 6/2014 | Vossoughi | G02C 5/146 351/119 |
| 2015/0301360 A1* | 10/2015 | Chow | G02C 11/10 351/158 |
| 2016/0048025 A1* | 2/2016 | Cazalet | G02B 27/0176 351/116 |
| 2016/0216519 A1 | 7/2016 | Park | |
| 2016/0223820 A1* | 8/2016 | Chow | G02B 27/0172 |
| 2016/0246059 A1* | 8/2016 | Halpin | G02B 27/0176 |
| 2016/0274357 A1 | 9/2016 | Joo | |

* cited by examiner

ELECTRONIC EYE WEAR VIEWING DEVICE

This application claims the benefit of European Application No. 17155826.5 filed Feb. 13, 2017 and PCT/DK filed Feb. 13, 2018, International Publication No. WO 2018/146339 A1, which are hereby incorporated by reference in their entirety as if fully set forth herein.

FIELD OF THE INVENTION

The present invention is generally related to the field of electronic eyewear viewing devices.

BACKGROUND OF THE INVENTION

A growing interest in wearable terminals for easy usage and convenience has provoked quite some research and study work on various types of mobile terminals, for example electronic eyewear in the form of a pair of glasses.

Electronic eyewear viewing devices typically comprise one or more display modules with a small display, sometimes referred to as a microdisplay. Users wearing electronic eyewear with such a display module can view images generated by the microdisplay. However, since different users have different head dimensions and eye positions, a fixed display module does not always provide optimum viewing for all users.

An example of a prior art electronic eyewear viewing device is found in US2016/274357, wherein a terminal device is presented which is wearable on the eyes of a user's in a stable manner. A band frame is provided to be worn on a user's head. In a housing located in one end of the frame a control unit is provided. In a second housing located in the other end of the frame a battery is mounted. A third housing is coupled to a lateral surface of the frame contains another control unit. A front housing is coupled to this third housing by a hinge. A transparent display coupled to the front housing is to be located in front of one of the user's eyes.

Another example is given in US2016/216519, relating to a wearable display device employing a sliding structure. The device includes: a frame, a main unit coupled to the frame, a non-bending part, which includes a camera configured to capture an image of a forward direction and which is coupled to the main unit and is configured to slide to a first position, a hinge coupled with the non-bending part, and a bending part, which is configured to provide image information to a user, and which is coupled with the hinge to rotate within a predefined angle. When the bending part is rotated, the camera is exposed to the exterior and moves from the first position to a second position.

It is advantageous to provide for several axes of movement in the electronic viewing device, as this may greatly improve the ease of use and comfort for the operator.

Although the available area inside the viewing device is typically very limited, prior art viewing devices tend to have separate mechanical hinges for each axis. This results in limitations in the amount of angle directions or of changes in size. On the other hand, certain designs of ball joints create too much freedom, which can be counter-effective to position the display.

Hence, there is a need for an electronic eyewear viewing device that allows for quick and easy positioning of the display (compact area) without need for separate mechanical hinges for each axis.

SUMMARY OF THE INVENTION

It is an object of embodiments of the present invention to provide for an electronic eyewear viewing device which can be repositioned and rotated without separate mechanical hinges for each axis of movement. It is also an object of the present invention to provide for an electronic eyewear viewing device with improved possibilities to move and rotate a display module mounted on the frame of the device. It is a further object of the invention to provide for an electronic eyewear viewing device that can be put in and out of an operational mode by moving or rotating the display module.

The above objective is accomplished by the solution according to the present invention.

In a first aspect the invention relates to an electronic eyewear viewing device comprising a frame arranged to be wearable on a user's head, a display module comprising a display for viewing images and a carrier for carrying the display module, said carrier being connected to the frame. The electronic eyewear viewing device further comprises a primary pivoting hinge system arranged for interconnecting the carrier and the display module and comprising a first at least partially spherical joint rotatably mounted around a first axis passing through the first at least partially spherical joint via a first cut-out and rotatably mounted around a second axis connected with the first at least partially spherical joint via a second cut-out and passing through a hole in said first axis, whereby the second axis crosses the first axis through said hole in a centre point of the first at least partially spherical joint.

The proposed solution indeed allows for rotation of the display module with respect to the carrier in two different directions while having only one hinge system. This is accomplished by the specific design of the hinge system: by providing an at least partially spherical joint rotatably mounted around a first axis and rotatably mounted around a second axis. The first and the second axis cross in a centre point of the first at least partially spherical joint. This is accomplished by providing a hole in the first axis through which the other axis can pass. The electronic eyewear viewing device of the invention provided with such a hinge system allows quickly and easily positioning and rotating the display in an optimal area of the field of vision. Due to the hinge system it allows for small adjustments of the display angle towards the eye. This controlled freedom can be achieved in such a confined area thanks to the axes crossing in a centre point of the first at least partially spherical joint.

In a preferred embodiment the electronic eyewear viewing device comprises a secondary pivoting hinge system arranged for interconnecting the carrier with the frame. The secondary pivoting hinge system comprises a second at least partially spherical joint rotatably mounted around a third axis passing through the second at least partially spherical joint via a third cut-out.

Preferably the second at least partially spherical shaped joint is rotatably mounted around a fourth axis connected with the second at least partially spherical shaped joint via a fourth cut-out and passing a hole in the third axis, whereby the third and the fourth axis cross in a centre point of the second at least partially spherical joint.

The solution with two pivoting hinge systems allows for a wide range of options to move the display module. Thanks to the double hinge system there are then three or even four axes available around which rotation is possible. Hence, there are indeed many more options available for finetuning the placement of the display module.

In a preferred embodiment the first and the second axis have substantially orthogonal directions. Similarly, the third and the fourth axis preferably have substantially orthogonal directions, if present.

In a preferred embodiment the first axis is provided with a spring. This spring exerts a force on both the first axis and also on the second axis, which passes through a hole in the first axis.

Advantageously, the primary or the secondary pivoting hinge system comprises an activator arranged to make electrical connection. The pivoting hinge system is then so arranged that that activator rotatably makes electrical connection with a conducting element in the frame, the carrier or the display module to enter in a first operational mode and enters into a second operational mode when there is no electrical connection. One of these operational modes may be a low-power mode of the electronics or of the entire device, and the other one an active mode thereof. Instead of a binary activator, a potentiometer can be used to obtain that the electronics are aware of the actual rotation of the hinge, allowing the electronics to act accordingly.

In one embodiment the electronic eyewear viewing device comprises a shaped flexible printed circuit board to absorb mechanical stress.

In another embodiment the frame comprises a shaped resilient means.

Preferably the electronic eyewear viewing device is arranged for being implemented below or above the user's eye.

In an advantageous embodiment the frame has the form of a pair of glasses. In alternative embodiments the frame may be part of a headband, a helmet, a headphone or a carrier similar to an eyeglass frame without glasses.

In one embodiment the display module is arranged for being positioned in front of said glasses. Alternatively, the display module can be positioned behind the glasses, i.e. between the user and the glasses.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

The above and other aspects of the invention will be apparent from and elucidated with reference to the embodiment(s) described hereinafter.

BRIEF DESCRIPTION OF THE DRAWINGS

The invention will now be described further, by way of example, with reference to the accompanying drawings, wherein like reference numerals refer to like elements in the various figures.

DETAILED DESCRIPTION OF ILLUSTRATIVE EMBODIMENTS

Figure 1:
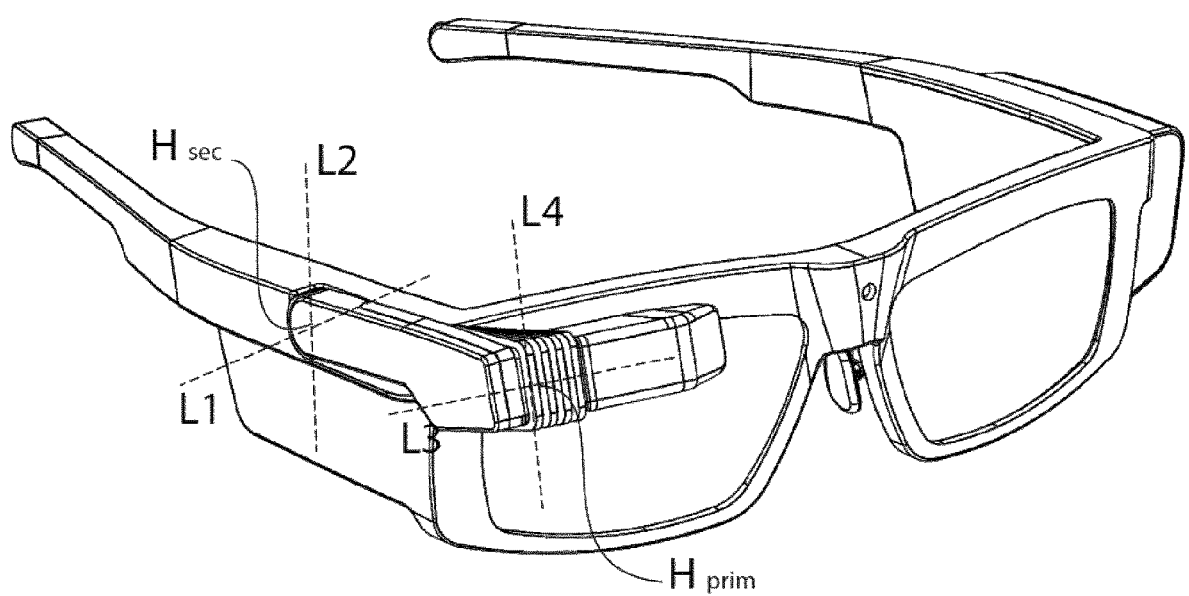
FIG. 1 illustrates an embodiment of the electronic eyewear viewing device according to the invention.

The present invention will be described with respect to particular embodiments and with reference to certain drawings but the invention is not limited thereto but only by the claims.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

It should be noted that the use of particular terminology when describing certain features or aspects of the invention should not be taken to imply that the terminology is being re-defined herein to be restricted to include any specific characteristics of the features or aspects of the invention with which that terminology is associated.

In the description provided herein, numerous specific details are set forth. However, it is understood that embodiments of the invention may be practiced without these specific details. In other instances, well-known methods, structures and techniques have not been shown in detail in order not to obscure an understanding of this description.

The present invention provides a pivoting hinge system for a display module that via a carrier is connected to the frame of the electronic viewing device. A primary pivoting hinge system is located between the display device itself and the carrier. In a preferred embodiment there is also a secondary pivoting hinge system present in the electronic eyewear viewing device to establish the interconnection of the frame and the carrier carrying the display module. In this way both a hinge system connecting the frame and the carrier and a hinge system ensuring interconnection of the display device itself and the carrier are simultaneously present in the device. Hence, the viewing device then comprises two, preferably identical, pivoting hinge systems. The primary hinge system can be considered as the main hinge system, which allows for rotation around two axes. The primary hinge system is intended for adjusting the display module in the right position with respect to the user's eye. A secondary hinge system between the carrier and the frame adds one or two more rotational axes. The secondary hinge system accounts for larger movements than the primary hinge system. So, the display of the display module can in that case overall be rotated around three or four axes. Overall the position of the display in front of the eyewear lens can so be adjusted to achieve an optimal position for the user.

Figure 2A:
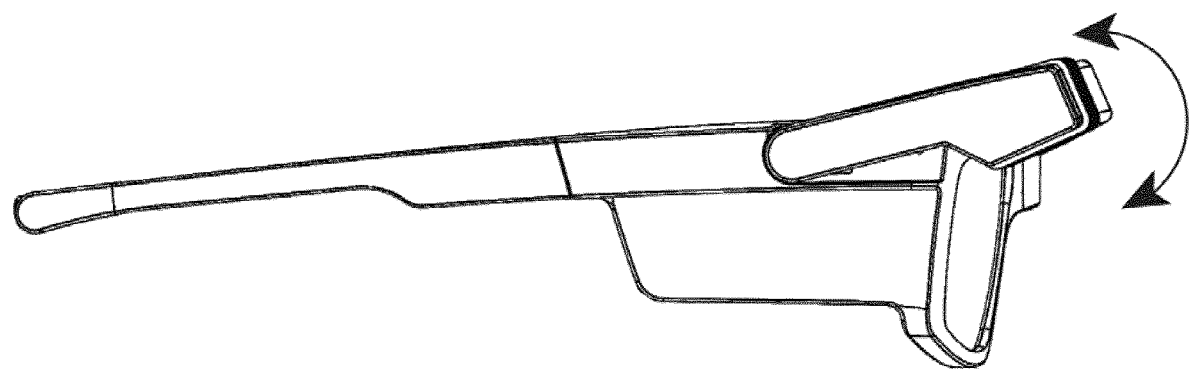
FIGS. 2A, 2B and 2C illustrate the direction of movement along the possible rotational axes.
Figure 2B:
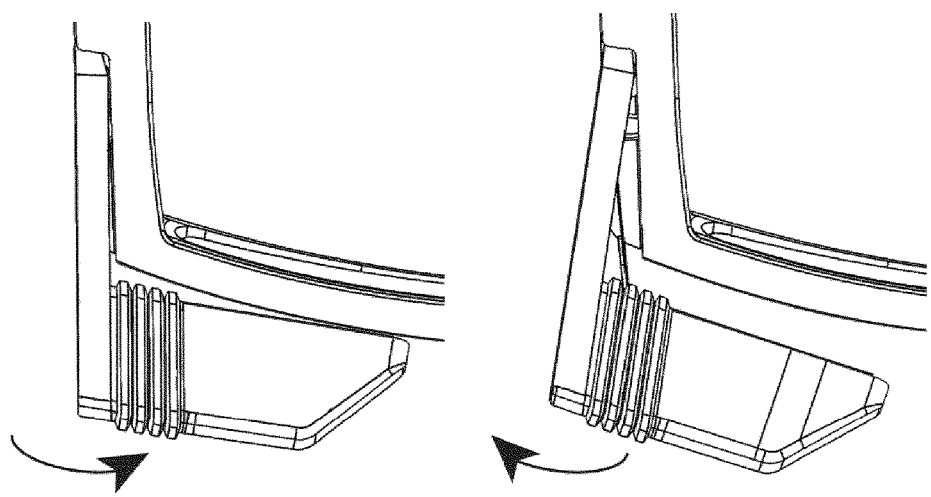
Figure 2C:
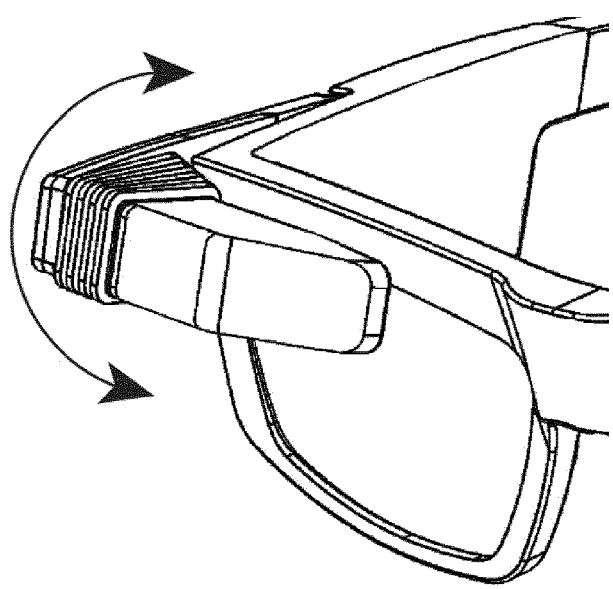

The embodiment of the electronic eyewear viewing device illustrated in FIG. 1 comprises two hinge systems, i.e. a primary and a secondary hinge system. On the carrier itself a primary hinge system ($H_{prim}$) is used to mount the display module. Rotation is possible along an axis L3 (upward-downward) and an axis L4 (inward-outward). A secondary hinge system ($H_{sec}$) connecting the carrier (15) and the frame (20) allows for rotation along axes L1 (up-down) and L2 (inside-outside), respectively. Note that on the secondary hinge system there may be only one axis present. In other words, a second axis is optional for the secondary hinge system. FIG. 2 illustrates the movement along some of the rotational axes: FIG. 2a for the L1 axis, FIG. 2b for the L2 axis and FIG. 2c for the L3 axis.

The primary hinge system ($H_{prim}$) and, if present, the secondary hinge system ($H_{sec}$) are in preferred embodiments each constructed in a single mechanical integrated design. Note that the mechanical construction of the two hinge systems is preferably substantially identical or exactly identical. Further mechanical details provided herebelow therefore apply both to a primary and secondary hinge system, unless explicitly stated otherwise. The mechanical design allows for a slim and elegant integration.

Figure 3:
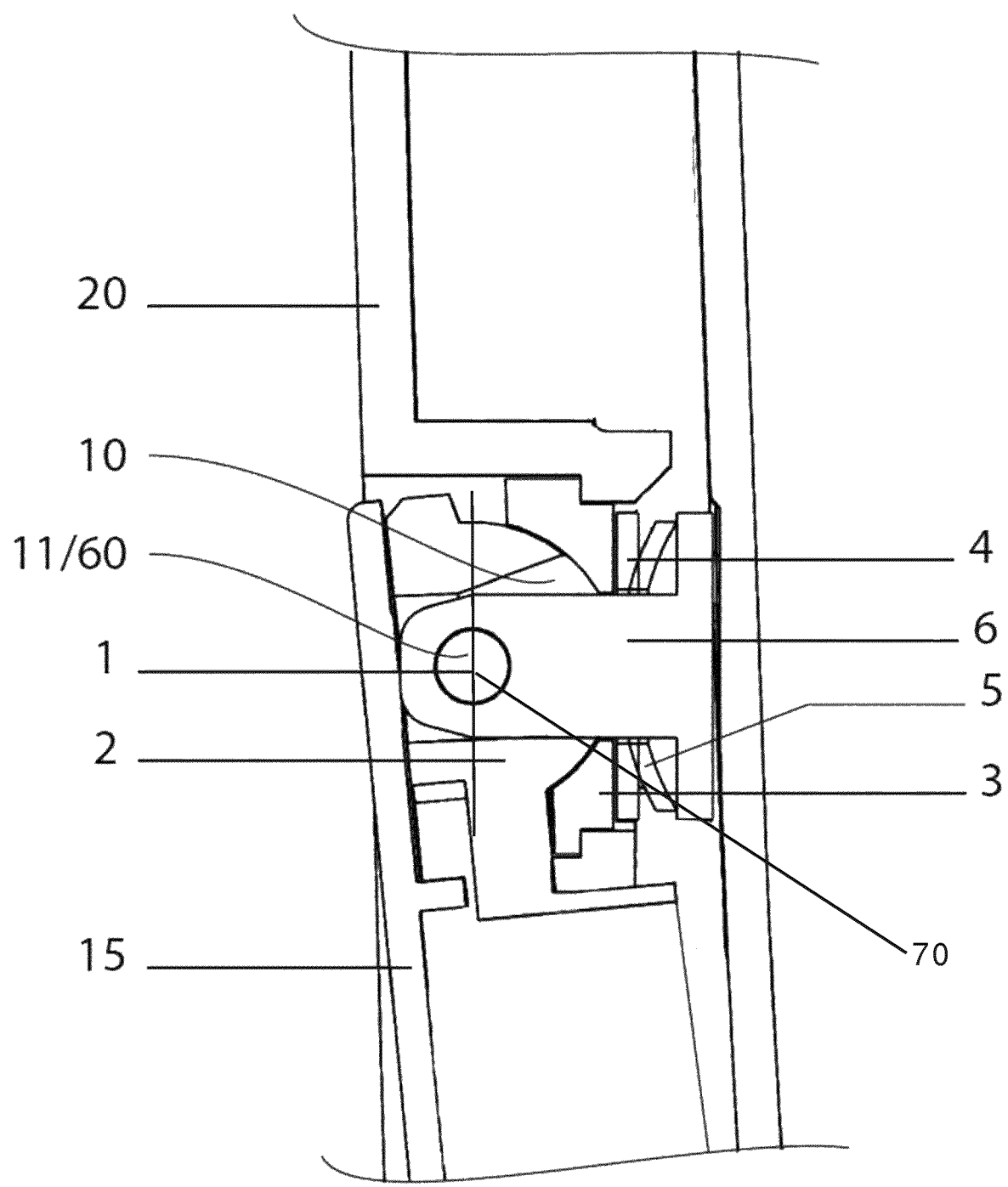
FIG. 3 illustrates a top view of a hinge system in the device of the invention.

The mechanical design is now presented more in technical detail. Reference is first made to FIG. 3. A cavity (3) is provided either in the frame (20) (for a secondary hinge system, as in the embodiment shown in FIG. 3) or in the carrier (15) (in case of a primary hinge system), depending on where the hinge system is to be placed. In the cavity fits a carrying joint (2) having a cut-out (10) which allows movement along a first axis (6). Another cut-out (11) in the carrying joint (2) allows movement along a second axis (1) different from the first axis. In one of the axes a hole (60) is provided in order to let the other axis pass.

Figure 4A:
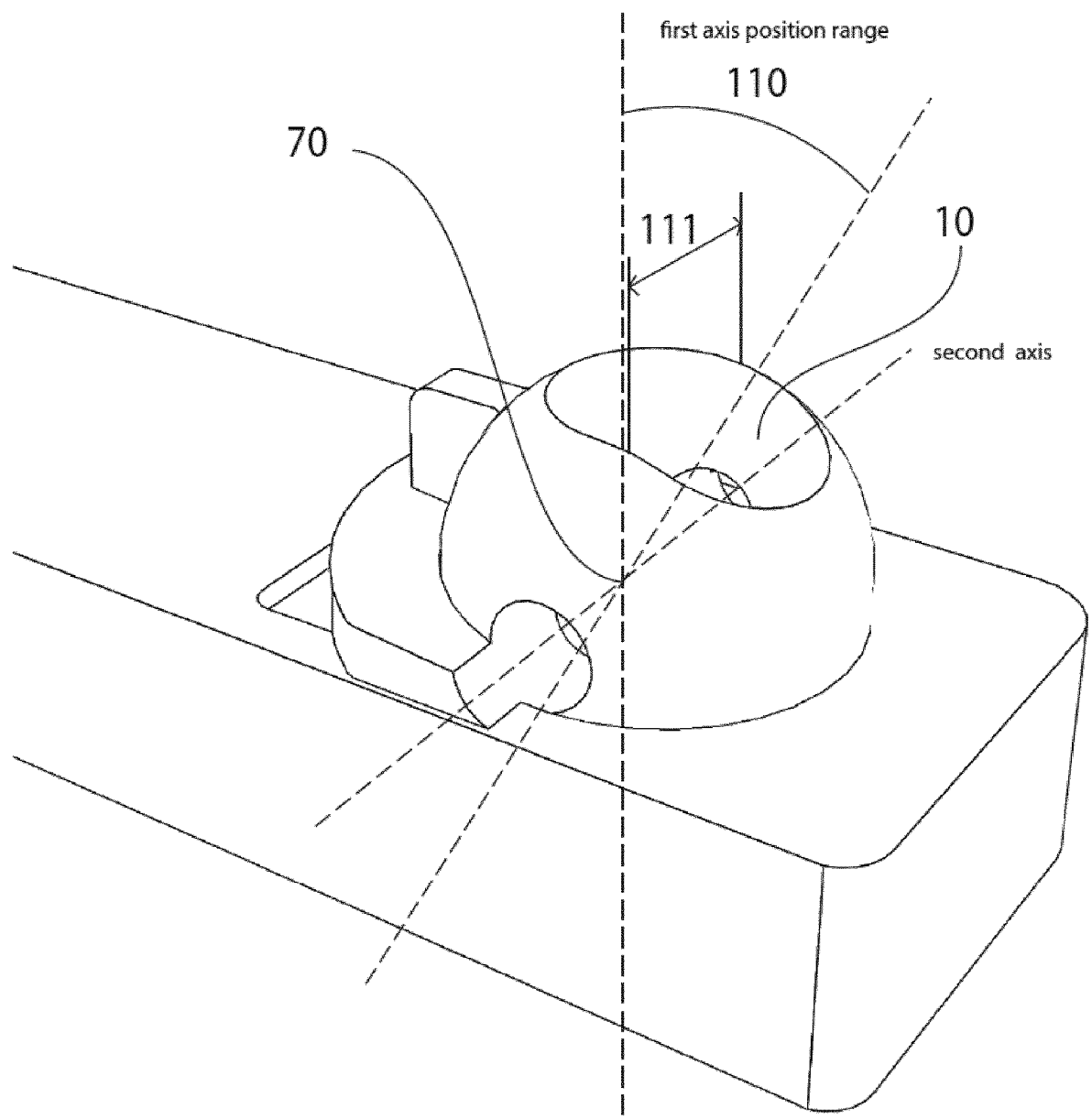
FIGS. 4A and 4B illustrate more details on the shape of the cut-out in the joint and the positioning of the axes.
Figure 4B:
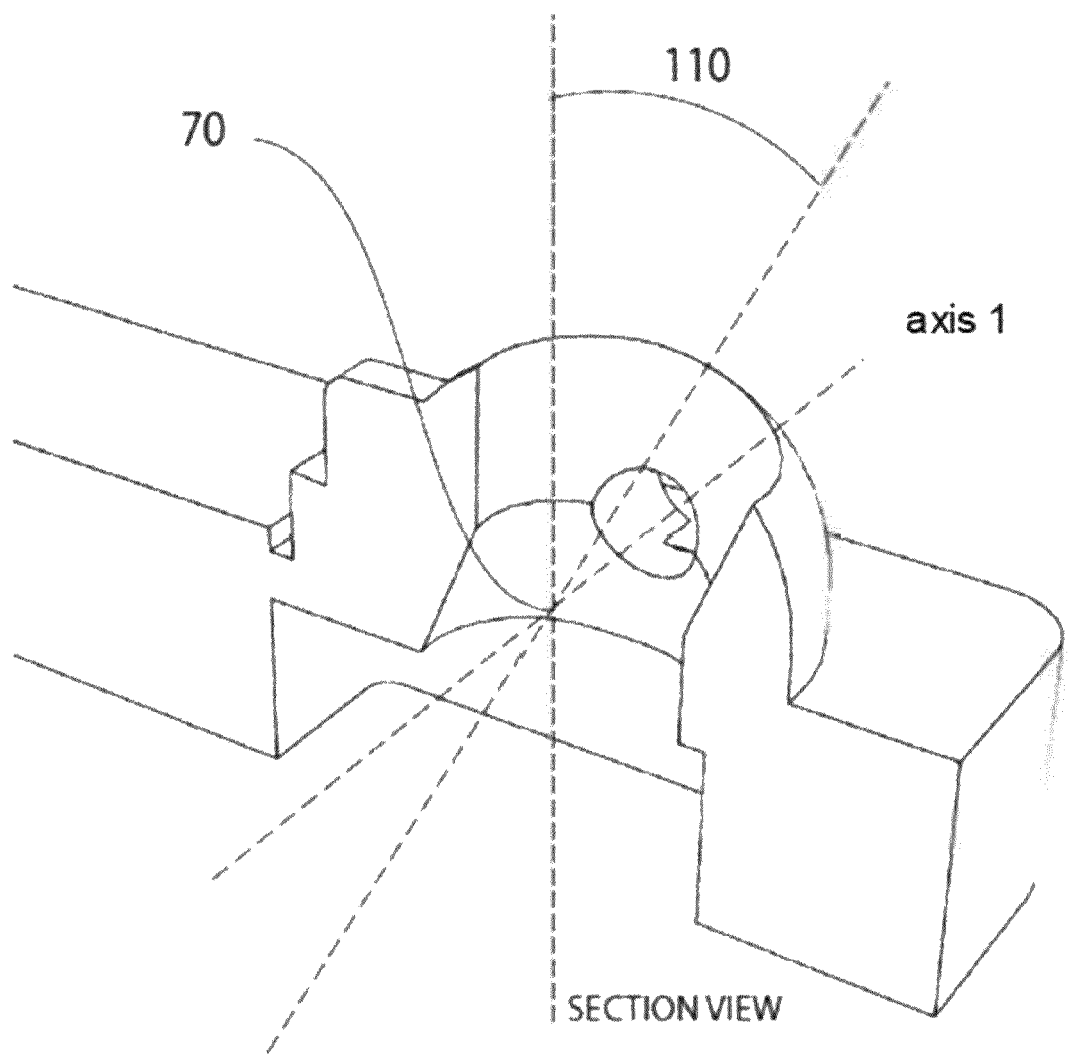

The cut-out (10) defines the freedom in the axis direction of the first axis (6) and can have different shapes. The shape of the cut out (10) allows movement around the second axis (1). FIG. 4A provides more detail. The inner side of the joint is depicted with more detail in FIG. 4B. The direction of the second axis 1 is also illustrated in the figure. The first and second axis cross in centre point (70) of the carrying joint. The width (111) of the cut-out is obviously at least equal to the width of the first axis (6). The angle (110) between the two extreme positions of the first axis (6) can vary to control the allowed angle of rotation of the hinge around the second axis (1). The plane defined by the two extreme positions of the first axis (6) is substantially perpendicular to the second axis (1).

The carrying joint (2) is at least partially spherical shaped. The joint can be implemented as a full sphere, half a sphere or a part of a sphere. The part of the sphere is defined based on the maximum relative movement between the moving parts, e.g. the carrier and the display module, the carrier and the frame, or, by combining the two hinge systems, the frame and the display module. To limit this movement stoppers are provided in all directions of movement.

In the embodiment of FIG. 3 and FIG. 4 the hinge system is placed in a cavity which has the same centre point as the centre of the spherical carrying joint (2). This is the most typical situation when implementing the present invention. However, in alternative embodiments, instead of a cavity a flat surface can be used. The carrying joint sphere thus is in contact with the flat surface instead of a cavity. The centre point shared by the cavity and the at least partial spherical shape is the crossing point of the two created axes. The axes can cross in the centre point due to the hole (60) provided in one of the axes to let pass the other axis.

Figure 5:
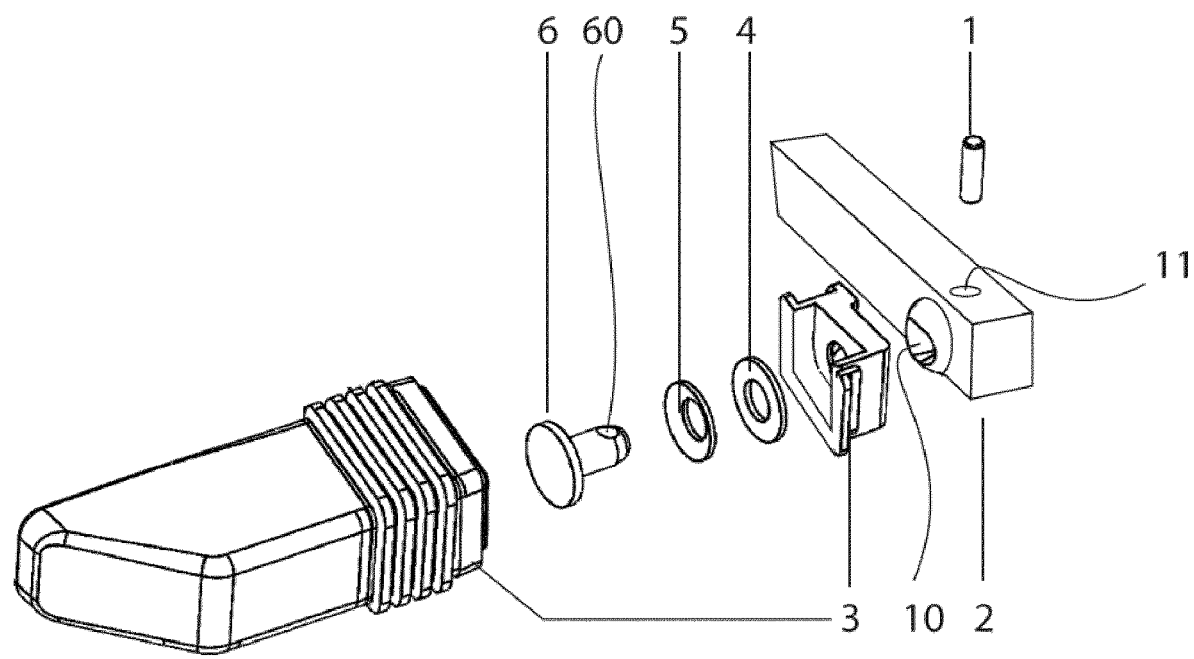
FIG. 5 illustrates details of how the first axis is mounted in the hinge system.

FIG. 5 illustrates how various components are mounted in one embodiment of the invention. The example is considered here of a hinge system interconnecting the carrier and the display module, i.e. a primary hinge system. With the aid of washers (4) and a spring (5) a first axis (6) is connected to the carrier joint (2) provided with a cut-out (10).

The spring (5) is implemented on the first axis (6) to create the required friction for controlled adjustments for both axes. The spring pushes the cavity and spherical joint together in order to create the required friction on the first axis. As the second axis (1) is passing through the first axis (6) via hole (60) the spring also creates a controlled friction between the second axis (1) and the carrier (2). This creates a controlled friction for the second axis (1).

The first axis (6) passes through the carrying joint (2) via a cut-out (10). The joint also comprises a cut-out (11) for allowing the second axis (1) to pass. The first axis comprises a hole (60) through which the second axis can pass. Alternatively, it is also possible in certain embodiments to have a hole in the second axis, so that the first axis can pass. The particular feature of having this hole allows obtaining a compact and slim mechanical design which is mandatory for an electronic eyewear viewing device. In the most general case it suffices that the two axes have a different direction. In a preferred embodiment the directions of the two axes are orthogonal or close-to-orthogonal, for example deviating only a few degrees, e.g. less than 5 or less than 10 degrees, from perfectly orthogonal.

Figure 6:
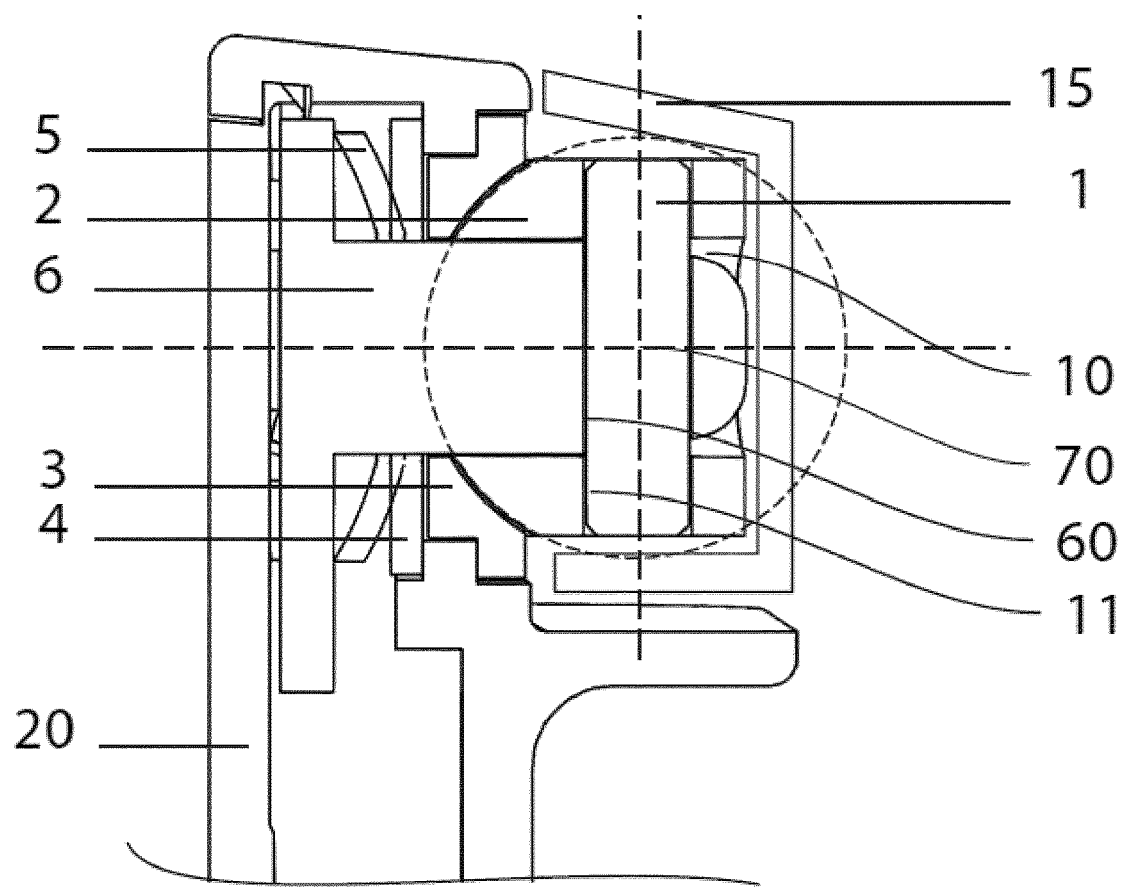
FIG. 6 illustrates a sectional view of the hinge system, showing also the second axis.

FIG. 6 provides a vertical sectional view of a secondary hinge system. Note that a similar construction is applied in the primary hinge system. In a secondary hinge system a third axis is used similar to the first axis in a primary hinge system and a fourth axis similar to the second axis. Therefore the same reference numbers are used. It is shown in FIG. 6 that the fourth axis (1) is rotatably connected to the third axis (6) and the centre point 70 of both axes coincides with the centre axis of the spherical shape of the carrying joint (2). As already mentioned, one of the axes comprises a hole to let the other axis pass.

Figure 7:
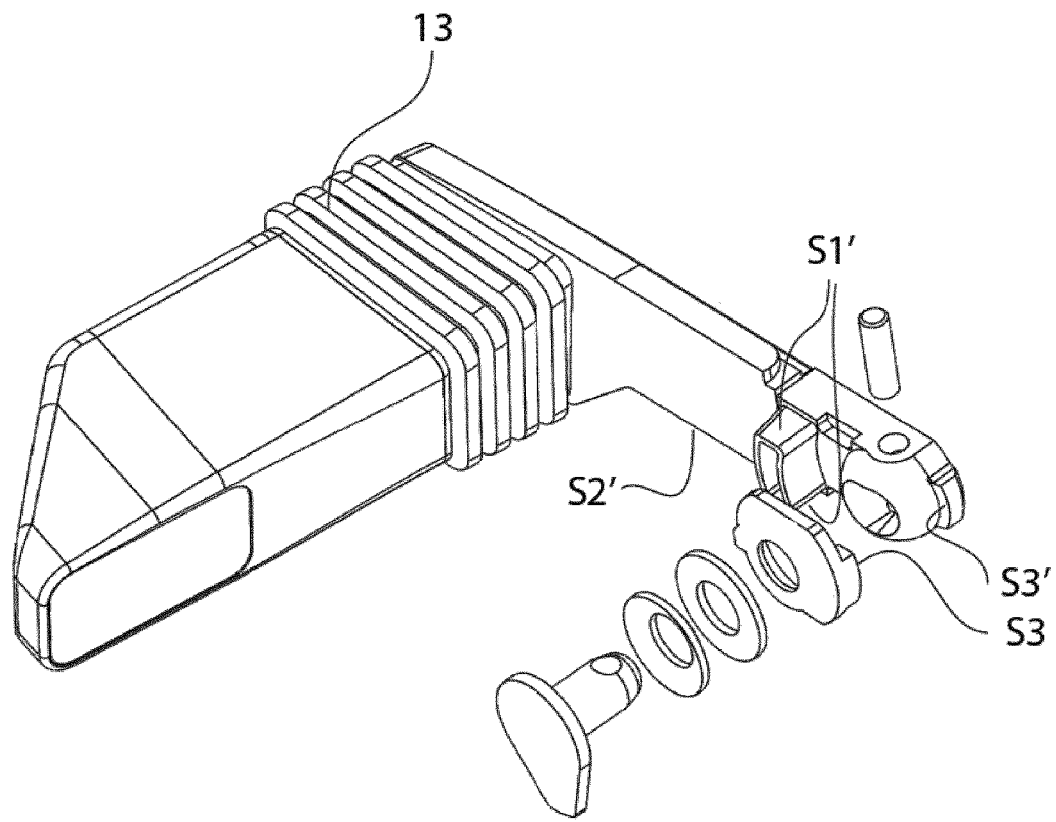
FIG. 7 illustrates the use of stoppers in the hinge system.

The cut-out (10) in the carrying joint allows for the third axis to rotate along the L1 direction (see FIG. 1) whereas the joint is also able to rotate around the fourth axis (L2 direction). Conventional stoppers define the total rotation angles for the various axes: s1', s2' for the L1 direction, s3' touches s3 against the frame for the L2 direction. FIG. 7 provides an illustration.

The relative position of the carrying joint and cavity is interchangeable. In a primary hinge system the carrying joint can be part of the display module while the cavity is part of the carrier, but the carrying joint can also be part of the carrier. This results in the cavity being part of the display module. Same can be said when the hinge is the connection between the frame and the carrier or the connection between the frame and the display module. The result will be the same.

One of the hinge systems may comprise an activator, via which electrical contact can be made with a switch or potentiometer (120), positioned e.g. in the frame or in the carrier. Depending on the display position, the electronic eyewear viewing device can so be brought from one operational mode into another operational mode. An example: by moving the display away from the field of view (upwards, downwards or sidewards), the device can be brought into sleep mode or energy save mode, whereas when the display is in the field of view, the device automatically goes into an active mode. The activator may, however, also have alternative functionalities, e.g. switching a camera on or off, switching a calling functionality on or off, switching a light on/off, rendering general sensors active or not etc. . . . .

Figure 8:
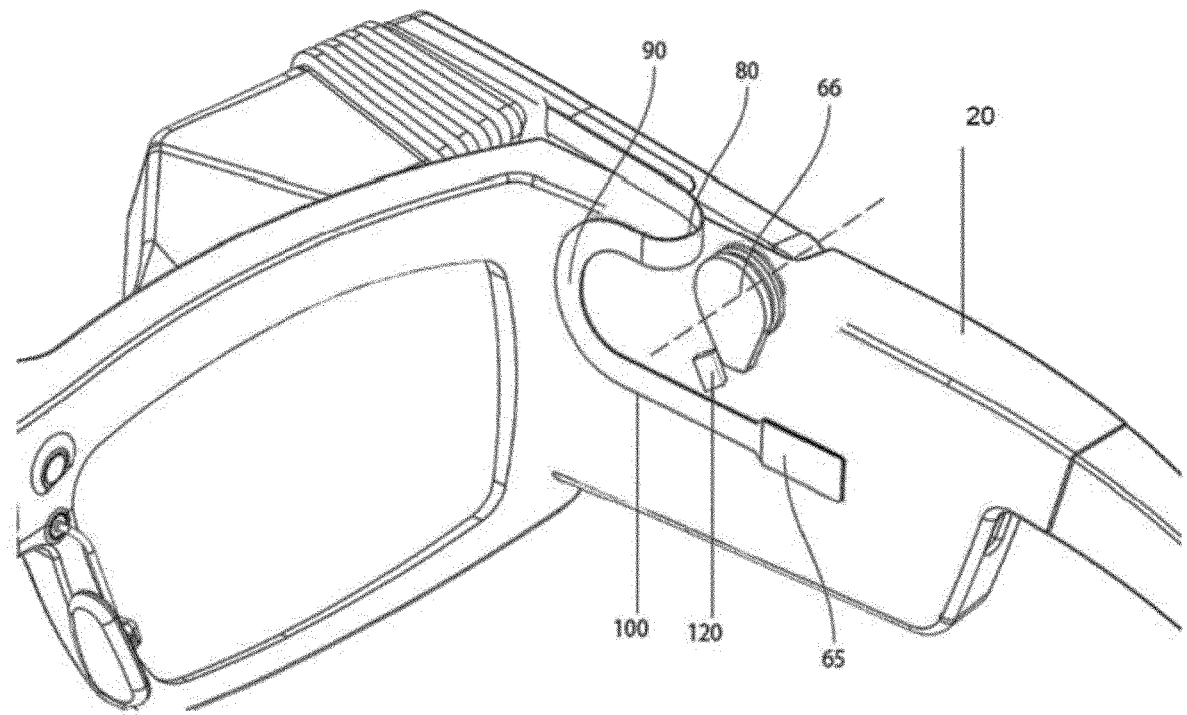
FIG. 8 illustrates a flexible printed circuit board.

In order to absorb mechanical stress on the electrical connection between display and main board it may be beneficial to provide a flexible PCB (printed circuit board) with a special designed shape to allow stress to be absorbed in two directions (see FIG. 8). Movement generated when rotating the display module or carrier along the axis L2 can be absorbed with a bent (80) flexible PCB, whereas the movement generated when rotating the display module or carrier along axis L1 can be absorbed by a long shaped tail (100) preferably including a bending (90) in the PCB to absorb the movement. The bending (90) can be positioned in front of the hinge (66) or at the back of the hinge (66), in a preferred solution as close as possible to the axis. The tail of the PCB is allowed to slightly move in the frame housing (20). The end of the tail is equipped with a connector (65). An alternative design solution is to use wired cables.

In another embodiment the frame comprises shaped resilient means 13 (see e.g. FIG. 7), for example in the form of rubber or elastomer material. Such material is preferably in the frame so that it can absorb possible hinge movement and maintain a closed housing.

In a most preferred embodiment the frame has the form of a pair of glasses. These glasses can for example be safety glasses, sunglasses, prescription glasses or piano glasses.

Alternatively, the proposed invention can also be used without glasses. Possible alternatives to an eyeglass frame are the use of a headband, a helmet, headphone or a carrier similar to an eyeglass frame without eyeglasses.

The display module can be positioned above or below the user's eye. In case a pair of glasses is used the device according to this invention can be positioned in front or behind the glasses.

The display module can be moved before the user's eye by an easy push upward or sideward of the display module.

The display can be electronically, processor or computer driven and can display images, including text and/or video on a small display screen or image exit window along an optical axis. The display may also be an active matrix display. The display may also include a backlight.

The display module may optionally also comprise a camera.

Figure 9:
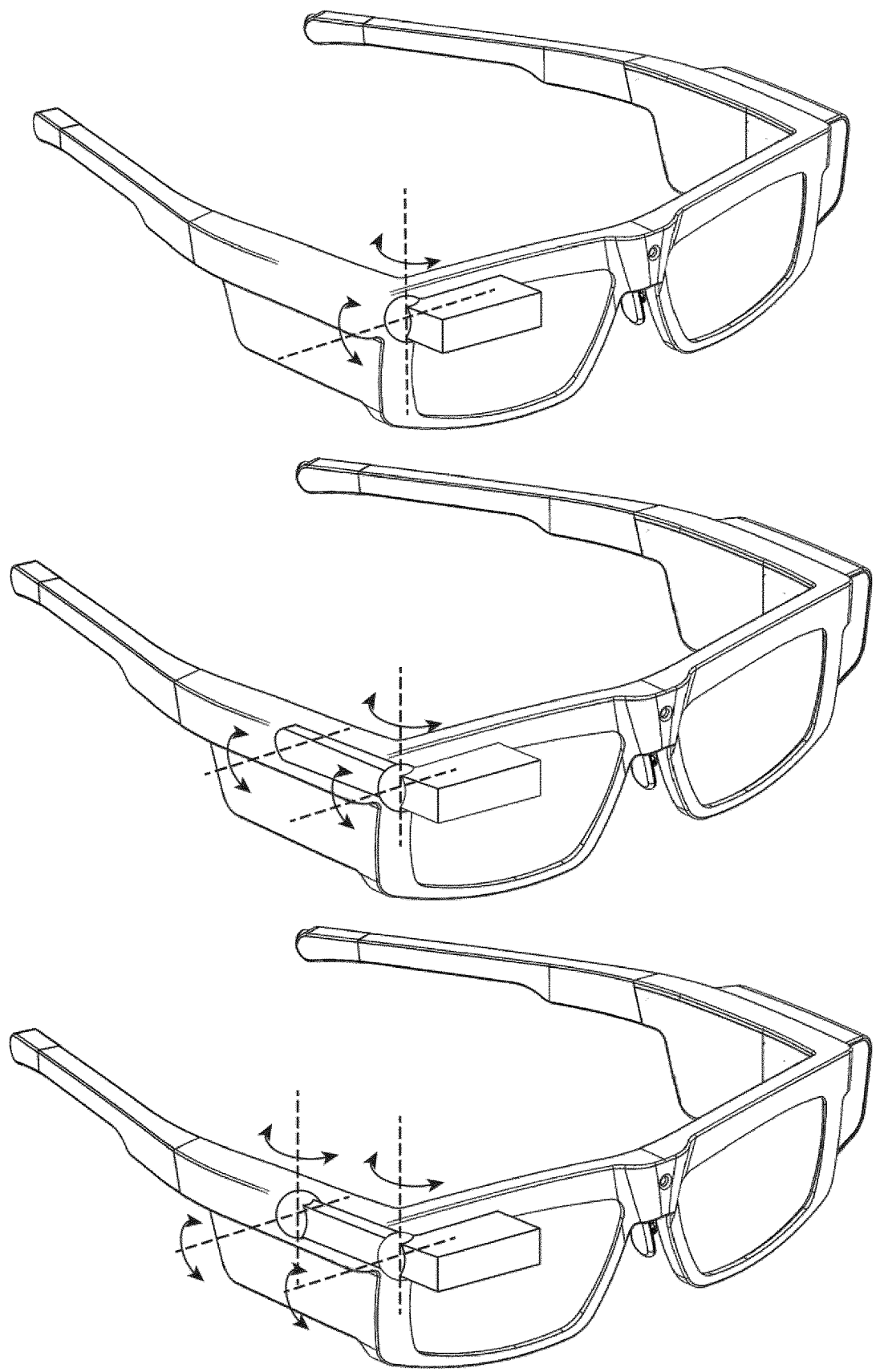
FIG. 9 illustrates the three basic embodiments of the present invention.

The electronic eyewear viewing device of the invention offers a compact and simplified solution to allow the user to position the display module in a well-defined axis freedom. The positioning adjustment is defined in 2, 3 or 4 axes with well-defined boundaries. This allows the user to quickly adjust the display position without the risk of having too many degrees of freedom (for example, rotating the display in an unwanted angled position relative to the horizon). FIG. 9 summarizes the implementation with 2, 3 or 4 axes, respectively. The top of FIG. 9 represents an embodiment with only a primary hinge system allowing rotation of the display module around two different axes. In the middle figure a secondary hinge system is added that offers an additional axis to rotate the carrier carrying the display module upwards and downwards over a larger distance than possible when rotating the display module upwards or downwards around an axis of the primary hinge system. Finally, at the bottom of FIG. 9 the secondary hinge system is also rotatable inwards and outwards.

The electronic eyewear viewing device of the invention offers the possibility to easily bring the display module in a position adapted to the specific user. This can be an important asset, for example for professional usage, where not only reliable usage of the display is required, but also quick removal of the display when it is not in use. Further, the proposed solution is suitable for use with (various types of) glasses, which impose important space constraints.

While the invention has been illustrated and described in detail in the drawings and foregoing description, such illustration and description are to be considered illustrative or exemplary and not restrictive. The foregoing description details certain embodiments of the invention. It will be appreciated, however, that no matter how detailed the foregoing appears in text, the invention may be practiced in many ways. The invention is not limited to the disclosed embodiments.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. Electronic eyewear viewing device comprising
a frame (20) arranged to be wearable on a user's head,
a display module comprising a display for viewing images,
a carrier (15) for carrying said display module, said carrier being connected to said frame,
wherein said electronic eyewear viewing device comprises
a primary pivoting hinge system arranged for interconnecting said carrier (15) and said display module and comprising a first at least partially spherical joint (2) rotatably mounted around a first axis (6) passing through said first at least partially spherical joint via a first cut-out (10) and rotatably mounted around a second axis (1) connected with said first at least partially spherical joint (2) via a second cut-out (11) and passing through a hole (60) in said first axis, whereby said second axis crosses said first axis through said hole in a centre point (70) of said first at least partially spherical joint, wherein said first axis (6) is provided with a spring (5), said spring exerting a force both on the first and on the second axis.

2. Electronic eyewear viewing device as in claim 1, comprising a secondary pivoting hinge system arranged for interconnecting said carrier and said frame, and comprising a second at least partially spherical joint rotatably mounted around a third axis passing through said second at least partially spherical joint via a third cut-out.

3. Electronic eyewear viewing device as in claim 2, wherein said second at least partially spherical joint is rotatably mounted around a fourth axis connected with said second at least partially spherical joint via a fourth cut-out and passing through a hole in said third axis, whereby said third axis and said fourth axis cross in a centre point of said second at least partially spherical joint.

4. Electronic eyewear viewing device as in claim 1, wherein said first axis and said second axis have substantially orthogonal directions.

5. Electronic eyewear viewing device as in claim 1, wherein said primary pivoting hinge system or said secondary pivoting hinge system comprises an activator arranged to make electrical connection.

6. Electronic eyewear viewing device as in claim 5, wherein said primary or said secondary pivoting hinge system is so arranged that said activator rotatably makes electrical connection with a conducting element (120) in said frame, said carrier or said display module to change operational mode based on a rotational position of said hinge system.

7. Electronic eyewear viewing device as in claim 5, comprising a bent flexible printed circuit board to absorb mechanical stress.

8. Electronic eyewear viewing device as in claim 1, wherein said frame comprises a shaped resilient means.

9. Electronic eyewear viewing device as in claim 1, arranged for being implemented below or above the user's eye.

10. Electronic eyewear viewing device as in claim 1, wherein said frame has the form of a pair of glasses.

11. Electronic eyewear viewing device as in claim 10, wherein said display module is arranged for being positioned in front of said glasses.

* * * * *